Oct. 30, 1945.   R. B. PURKISS   2,388,181
DOWEL PIN ASSEMBLY
Filed March 5, 1943
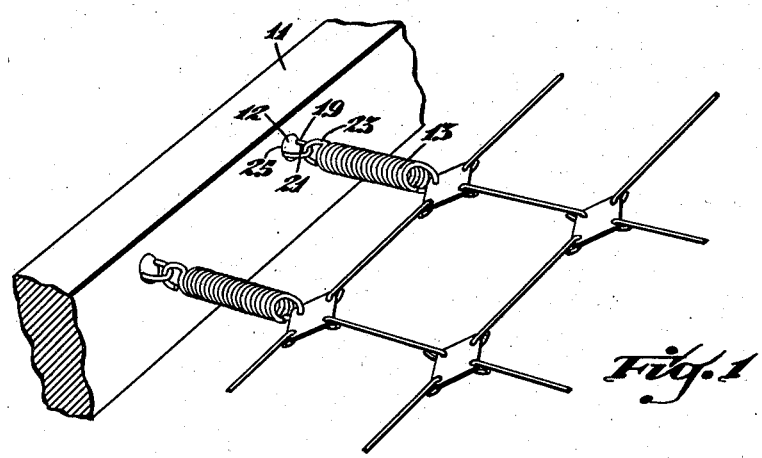
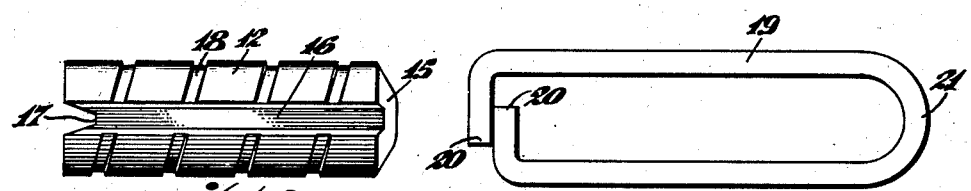
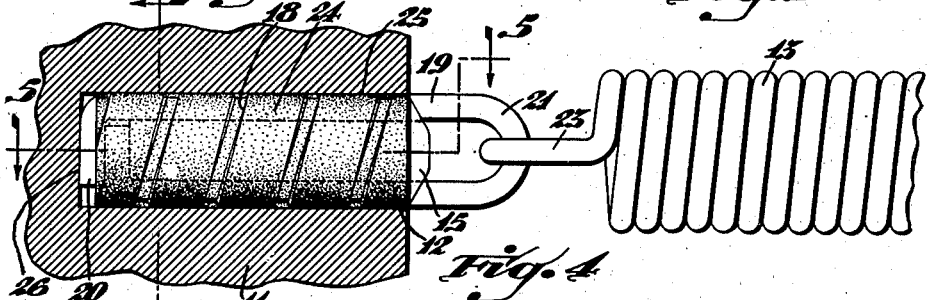
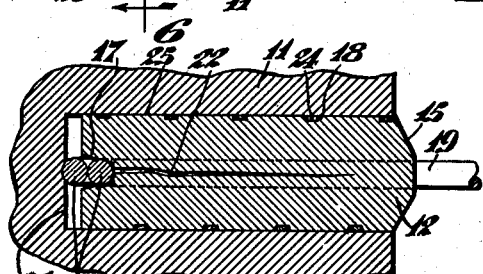
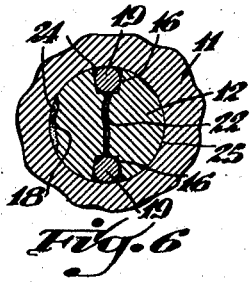
INVENTOR.
BY Robert B. Purkiss
Wood, Arey, Herron & Evans
Attorneys.

Patented Oct. 30, 1945

2,388,181

UNITED STATES PATENT OFFICE 2,388,181

DOWEL PIN ASSEMBLY

Robert B. Purkiss, Indianapolis, Ind., assignor to Hill-Rom Company, Inc., Batesville, Ind., a corporation of Indiana Application March 5, 1943, Serial No. 478,124

5 Claims. (Cl. 85—2.4)

This invention relates to a dowel pin assembly for insertion in a recess and is particularly concerned with a means for providing in association with a dowel pin a projecting ring extension of steel wire or similar material to which can be affixed some other object which it is desired to secure to the surface in which the dowel pin is inserted. As illustrative of the utility of the invention, the description will be confined to the representative installation of a flat bed spring secured by a coiled spring to the structure of the invention inserted in the rails of a bed frame. However, as will be apparent, this installation is only representative and the utility of the invention may extend to a wide variety of fields.

In affixing a flat bed spring to the sides and ends of a bed frame a problem exists in that it is necessary to provide in the inner side surfaces of the frame attachment means for engaging the ends of the coiled springs which are conventionally used to support the flat spring frame. It is essential that these attachment means be positioned very securely as they are subjected to strains and stresses of substantial force, for example, when a heavy person is positioned on the bed. Likewise, it is essential that there be no holes or openings of any sort adjacent the attachment means as such holes and openings provide recesses for the accumulation of dirt and may become a breeding place for bed bugs and other vermin.

Various solutions of this problem have been proposed but without undue complication of parts or structure it has been difficult to provide a form of attachment means which is free from one or more of the objections mentioned.

In the structure of the present invention it is proposed to provide a dowel pin formed from wood or some similar cleavable material, engage with the pin a ring of steel wire or the like bent in the desired configuration and to insert this pin and ring into a preformed recess in a bed rail or similar surface in such a way that the wire will expand and in many instances actually split the surface of the pin to provide an exceedingly tight and secure fit between the pin and the sides of the aperture. For engagement with the end of the coiled spring supporting the bed spring an end of the ring may be extended beyond the forward end of the pin.

With this general concept in mind, one of the objects of the invention has been to provide a dowel pin assembly comprising a pin and a wire ring, the ring being adapted to engage with the pin so as to leave a looped portion projecting outwardly when the pin is positioned in a preformed aperture.

Another object has been to provide a pin formed from cleavable material such as wood and so configurated as to expand circumferentially due to the pressure exerted on the sides and end of the pin by the ring when the pin is forced into an aperture.

Another object has been to provide a pin which is configurated in such a way as to maintain a stronger adhesive contact against the sides of the aperture.

Another object has been to provide a dowel pin assembly for the general purpose described which is of simple and cheap construction but which can be inserted in an aperture in such a way as to provide a very tight fit leaving no openings in which dirt or vermin may lodge.

Other and further objects and advantages will be apparent from the further and more detailed description of the invention when considered in conjunction with the drawing in which:

Figure 1 represents a perspective view of a dowel pin assembly of the general type of the invention in a representative installation, in this case supporting a coiled spring which in turn is affixed to an ordinary flat bed spring of conventional design.

Figure 2 is a side elevation of the pin.

Figure 3 is a side elevation of the wire ring which with the pin comprises the assembly.

Figure 4 is an elevational view showing the dowel pin assembly fully inserted in the aperture and supporting the coiled spring. In this view the bed rail is shown in section and partially broken away to illustrate better the details of the construction.

Figure 5 is a sectional view along the line 5—5, Figure 4.

Figure 6 is a sectional view along the line 6—6, Figure 4.

As illustrated in Figure 1, 11 is a bed rail which may be formed of either wood, as shown, or metal. The pin 12 is inserted in a preformed recess 25 in the inner face of the rail with a looped end 21 of the wire ring 19 which forms a part of the dowel pin assembly projecting inwardly from the side of the rail. A coiled spring 13 terminates in an extended hook 23 which is engaged with the looped portion 21 of the ring 19 to secure a flat bed spring in position across the bed. In Figure 1, two pins of the type of the invention are shown and these are identical in construction. Similar pins may be extended around the sides and ends of the bed to support additional coiled springs, all of which may be affixed to the flat bed spring in the manner illustrated. The bed spring and the manner of its attachment to the coiled springs form no part of the present invention.

The construction of the pin itself is shown in detail in Figure 2. The pin 12 is of generally cylindrical construction and may have a rounded surface 15 at the forward end thereof. A groove 16 extends the entire length of the pin parallel to its axis and terminates in a notch 17 which extends diametrically across the rear end of the pin. A similar groove (see Figure 6) is formed in the reverse side of the pin and this groove also terminates in the notch. The grooves may be tapered inwardly and should be sufficiently deep to permit the positioning therein of the sides and rear end of the wire ring 19 so that the outer side surfaces of the wire ring protrude to a slight degree only prior to the insertion of the assembly in the recess. The notch is also tapered inwardly. In the preferred embodiment both of the free ends 20 of the ring are seated in it (see Figure 5) and it should be of such depth that a rather substantial part of one end will protrude to engage the rear surface 26 of the recess 25 when the assembly is in position. Screw threads 18 may be formed in the sides of the dowel pin. These threads assist in providing a better adhesive engagement between the sides of the pin and the sides of the aperture and tend to make the positioning of the pin more secure against outward straining actions.

The ring 19 may be formed from a length of rounded steel wire or the like configurated to provide a looped end extension 21. Preferably the ring may be split as illustrated with its sides extending laterally and terminating in the ends 20 which may overlap to a slight degree.

In operative position as illustrated in Figure 4, the ring 19 is placed over the pin 12 with the sides resting in the grooves 16 of the pin and the ends overlapped in the notch 17. Since the ring is preferably somewhat longer than the recess, the looped end 21 will protrude after insertion. The pin is first coated with adhesive 24 and this adhesive will tend to build up in the screw threads 18 in the sides of the pin. The pin assembly is then inserted into the recess 25 preformed in the side of the rail and is forced inwardly by pressure exerted against the rounded end 15 of the pin. When the pin has been forced into the recess to an appreciable extent an end 20 of the ring contacts the rear wall 26 of the recess. This action is illustrated in Figure 5. As the pressure is continued it becomes concentrated particularly along the sides and rear end of the pin as defined by the grooves 16 and the notch 17 due to the forcing of the sides and ends 20 of the ring against these particular areas. Ultimately, as shown in Figures 5 and 6, the ring tends to expand the pin circumferentially and in many instances forms a cleavage 22 in the pin thereby making a very tight fit between the sides of the pin and the sides of the aperture in much the same way as a similar result is obtained by wedges driven into the end of an ax handle. In the preferred embodiment the expanding action is accentuated because the surfaces of the ring are round whereas the grooves and notches into which they are forced are tapered inwardly.

The adhesive 24 which may be used rather liberally tends to fill up the threads 18, the cleavage or split 22 and any surface irregularities which may exist. When the adhesive has fully dried, due to the expanding action of the ring the pin will be found to be very securely positioned and fully resistant to all ordinary stresses and strains which may be applied to the looped end 21 of the ring which protrudes from the forward end. The rounded end 15 of the pin should be left protruding slightly to form a surface sealed against the entrance of dirt, germs and vermin.

One of the particular features of the invention is the simplicity of manufacture. Pins having the desired configuration may be turned out in mass production at a very low cost while the same is true of the rings 19. The fact that the ring is preferably split rather than complete further reduces the cost of manufacture and improves the mechanical action of the structure as the overlapped ends 20 tend to split the pin at the notch 17 more readily than would be the case if a complete ring were utilized. Also as driving pressure is applied to the rounded end 15 of the pin each of the ends 20 of the ring tends to approach the side of the ring opposite to the one of which it is an extension. In this way when the pin has been fully inserted the circumference of the ring is actually reduced and the sides of the ring are fitted very closely in the grooves 16 thereby enhancing the general neatness of the structure and further sealing it at the forward end of the pin.

As illustrated in Figure 5 where an actual cleavage occurs it is usually in the area of the notch rather than along the sides. Since in any event the cleavage is only partial, the outer surface 15 of the pin is not marred in appearance nor is an opening formed at this point.

Having fully described my invention I desire to be limited only by the ensuing claims:

1. A dowel pin assembly comprising a pin formed of expansible material and having a notch in the rear end thereof and a ring having an end adapted to engage in said notch and to protrude therefrom and thereby to expand the surfaces of the pin outwardly when the assembly is forced against the inner surface of a recess a portion of said loop being extended beyond the end of the pin to provide an attachment element on the surface in which the pin is positioned.

2. A dowel pin assembly adapted to be inserted in a recess comprising a pin formed of expansible material and having a notch in the rear end thereof and a split ring having an attachment portion protruding from the front end of the pin, the free ends of said ring being seated in the notch in overlapped relationship and protruding therefrom whereby as the rear end of the assembly is forced against the inner surface of the recess the free ends of the ring will exert an expanding pressure on the notch area of the pin.

3. A dowel pin assembly comprising a pin formed of expansible material and having grooves in the sides thereof generally parallel to the axis of the pin and a split ring having an attachment portion protruding from the front end of the pin, the free ends of said ring being disposed at the rear end of the pin and overlapped and the sides of the ring being positioned in the grooves and protruding slightly therefrom whereby as pressure is applied to the front end of the pin the ring is contracted circumferentially and the sides of the ring exert an expanding pressure against the grooves in the pin.

4. A dowel pin assembly for insertion in a recess comprising a pin formed from expansible material having longitudinal grooves in opposite sides thereof, said grooves being joined at the rear end of the pin by a notch extending diametrically across said rear end and a loop formed from metal wire or the like, one end of said loop being adapted to engage in the notch and the sides thereof being adapted to engage in the grooves and normally to protrude slightly therefrom for expanding the pin when the assembly is forced into a recess, the other end of said loop being extended outwardly beyond the forward end of the pin to provide an attachment loop on the surface in which the recess is formed.

5. In combination, a dowel having a notch in the rear end thereof and a split ring for engaging with said dowel, a portion of said ring extending beyond one end of said dowel and forming an attachment member, the free ends of said ring being seated in the notch with one end overlying the other, the outer free end having a surface protruding beyond the rear surface of the dowel.

ROBERT B. PURKISS.